Patented Oct. 14, 1941

2,258,862

UNITED STATES PATENT OFFICE 2,258,862

SUBSTITUTED META-N GLYCINYL PARA-HYDROXY ARSENO BENZENES

George W. Raiziss, Le Roy W. Clemence, and Abraham I. Kremens, Philadelphia, Pa., assignors to Abbott Laboratories, North Chicago, Ill., a corporation of Illinois No Drawing. Original application January 30, 1933, Serial No. 654,240. Divided and this application July 12, 1937, Serial No. 153,200

1 Claim. (Cl. 260—445)

The present application is a divisional application of Raiziss et al. application, Serial No. 654,240, filed January 30, 1933, Patent No. 2,088,608, for "Meta-N-alkylamino para alkoxy phenyl arsonic acid and a method of making the same."

Our invention relates to a new group of compounds which are especially useful as therapeutic agents, more particularly in the treatment of trypanosomiasis and syphilis, and method of preparing the same.

We have observed that the 3-amino derivative of para-hydroxy-phenyl-arsonic acid generally does not form substitutions in the amino group. The production of such substitution products is desirable in chemotherapy for the preparation of valuable medicinal compounds.

We have found, however, that such substitution in the amino group is possible when the hydroxyl group in the para position to the arsonic acid group has been substituted to form oxy-derivatives.

According to our invention, we convert para-hydroxy-phenyl-arsonic acid to para-alkyloxy-phenyl arsonic acid, then introduce the $NO_2$ group in the 3-position, reduce the $NO_2$ to $NH_2$, and substitute on the $NH_2$ group.

Graphically, the procedure may be represented:

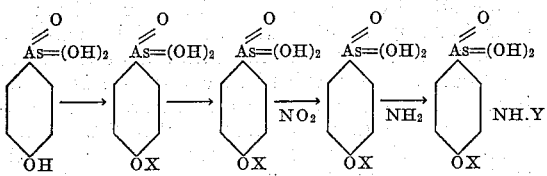

The substitutents X and Y are fully described below.

We have developed a method and produced a large number of compounds which represent substitutions in the hydroxyl with the production of methoxy derivatives and higher homologues of this series, such as ethoxy, propyloxy-butyl-oxy, etc., carboxy-methoxy and homologous derivatives of the same products. By nitration of the above mentioned compounds and subsequent reduction, we can produce the 3-nitro and 3-amino derivatives of this series of compounds, with the result that a large number of new compounds are formed. We have also prepared 2-nitro, 2-amino and substituted 2-amino derivatives of substituted para-hydroxy-phenyl-arsonic acid. Finally, in conformity with our theory, the 3-amino derivatives of substituted hydroxy-phenyl arsonic acid give substitution products in the amino group, due to the interaction of acyl substances, e. g., chlor-acetyl compounds such as chloracetic acid and substitution products thereof, such as chloracetamide, as well as acetic anhydride, propionic anhydride, and the like. Many of these pentavalent arsenicals of the newly described type can be further reduced so that the arsonic acid group can be changed into the arseno group, which is well-known for its high trypanocidal and spirillicidal effects. Such arseno compounds are valuable in the treatment of trypanosomiasis and syphilis and form the subject matter for the present application.

The final products contemplated by the present invention would thus have the following general formulas:

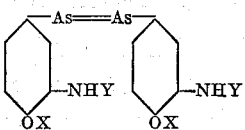

in which X is an alkyl radical such as methyl, forming a methoxy group; ethyl, forming an ethoxy group; and higher homologues and isomers thereof; X may also represent a substituted alkyl radical containing oxygen, nitrogen, etc., such as carboxymethyl, forming a carboxymethoxy group, carboxyethyl forming a carboxyethoxy group, or acetamide and its derivatives, such as acetyl anilide, and higher homologues and isomers. Y is an acyl or a glycyl group such as —$OCCH_3$ which forms the acetamino group —$NHOCCH_3$, or a homologue thereof such as propionyl, butyryl, etc. Y may also be a carboxymethyl radical —$CH_2COOH$ which forms the glycine group —$NH.CH_2COOH$, or an amide radical —$CH_2CONH_2$ which forms the glycine amide group —$NHCH_2CONH_2$, or an anilide radical $CH_2CONHC_6H_5$ which forms the glycine anilide group —$NHCH_2CONHC_6H_5$, or the glycine-toluidide radical $NHCH_2CONHC_6H_4.CH_3$, or the glycine hydroxy-anilide radical $$NHCH_2CONHC_6H_4.OH$$

or various isomers of the same. Hence, the substituent Y represents the acyl group $$-OCCH_2.R$$

where R is hydrogen, methyl or higher alkyl group and in addition Y represents the group —$CH_2CONHZ$ where Z represents hydrogen, phenyl or substituted phenyl group.

The following examples illustrating the preparation of the arsonic acid derivatives used in the preparation of our arseno-benzene derivatives will serve for illustrative purposes.

EXAMPLE I

*Alkyl-oxy-phenyl-arsonic acids*

N-propyl-oxy-phenyl-arsonic acid.—24 grams of the sodium derivative of para-hydroxy-phenyl-arsonic acid are suspended in a mixture of 150 cc. of methyl alcohol and 25 cc. of water in which 4 grams of sodium hydroxide have been dissolved. To this are added 12.3 grams of n-propyl bromide and the whole refluxed for twenty hours.

The reaction mixture is evaporated to dryness on a steam bath and the residue is dissolved in 50 cc. of water filtered and precipitated by the addition of hydrochloric acid. It may be purified by recrystallization from water or by dissolving in alkali and reprecipitating with hydrochloric acid. The product is para-n-propyl-oxy-phenyl-arsonic acid, and may be represented by the formula:

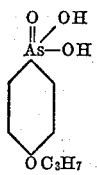

The reaction may be represented:

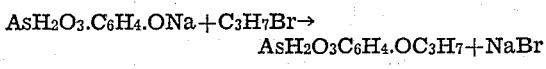

$AsH_2O_3.C_6H_4.ONa + C_3H_7Br \rightarrow$
$AsH_2O_3C_6H_4.OC_3H_7 + NaBr$

From the above, the preparation of the analogous alkoxy compounds referred to above will be obvious.

EXAMPLE II

*3-nitro-alkyl-oxy-phenyl-arsonic acids*

The following example of nitration will obviously apply, generally, to the other products referred to above.

13.7 grams of para-n-butyl-oxy-phenyl-arsonic acid, which may be prepared according to method described in Example I, are dissolved in 40 cc. of sulphuric acid and cooled to 0°–5° C. and nitrated with a mixture of 4.5 grams of nitric acid and 3 cc. of sulphuric acid allowing the temperature to rise to 15° C. This mixture is added to four volumes of crushed ice with stirring and the precipitated nitro compound is filtered off.

It may be recrystallized from water. The product is 3-nitro-4-n-butyl-oxy-phenyl-arsonic acid, and may be represented by the formula:

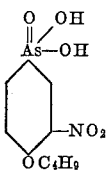

The reaction may be represented:

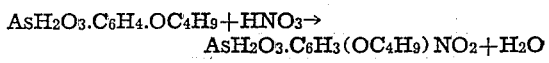

$AsH_2O_3.C_6H_4.OC_4H_9 + HNO_3 \rightarrow$
$AsH_2O_3.C_6H_3(OC_4H_9)NO_2 + H_2O$

EXAMPLE III

*3-amino-alkyl-oxy-phenyl-arsonic acids*

The following is a typical example of reduction to produce the 3-amino compounds:

24 grams of 3-nitro-4-ethoxy-phenyl-arsonic acid, which may be prepared according to method described in Example II, is dissolved in a solution of 20 grams of sodium carbonate in 160 cc. of water. This is added to a suitable reducing agent, preferably an alkaline paste of ferrous hydroxide, which is made as follows:

160 grams of ferrous sulphate are dissolved in 160 cc. of water and to this is added with stirring a solution of 120 grams of sodium hydroxide. The material is cooled to 30° C. before adding to it the solution of the nitro compound.

Other reducing agents, such as sodium hydrosulphite, may be used.

After the nitro compound has been added to the reducing agent it is stirred for one hour and then filtered. Hydrochloric acid is added to this solution until just acid to congo.

The amino compound crystallizes and is filtered off.

It may be recrystallized from water. The product is 3-amino-4-ethoxy-phenyl-arsonic acid and may be represented by the formula:

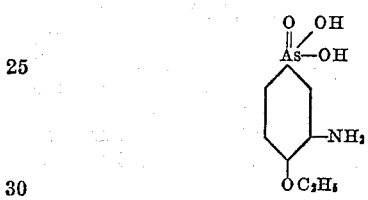

The reaction may be represented:

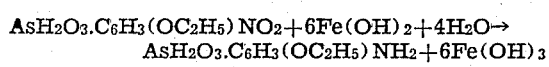

$AsH_2O_3.C_6H_3(OC_2H_5)NO_2 + 6Fe(OH)_2 + 4H_2O \rightarrow$
$AsH_2O_3.C_6H_3(OC_2H_5)NH_2 + 6Fe(OH)_3$

EXAMPLE IV

*3-acetyl-amino-4-ethoxy-phenyl arsonic acid*

36 grams of 3-nitro-4-ethoxy-phenyl arsonic acid which may be prepared according to method described in Example II are dissolved in a solution of 30 grams of sodium carbonate in 240 cc. of water. This is added to suitable reducing agent such as an alkaline paste of ferrous hydroxide, which is made by dissolving 240 grams of ferrous sulphate in 240 cc. of water and to this is added with stirring a solution of 180 grams of sodium hydroxide. The material is cooled to 30° before adding to it the solution of the nitro compound. After the nitro compound is added it is stirred for one hour and filtered. Hydrochloric acid is added until neutral to litmus, and then add 25 cc. of acetic anhydride, and stir well. A precipitate separates. Filter this and recrystallize from water. It crystallizes in fine needles. The product is 3-acetyl-amino-4-ethoxy phenyl arsonic acid and may be represented by the following formula:

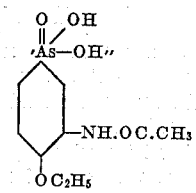

In the above manner the higher homologues of the acetyl group can also be introduced such as propionyl, butyryl, etc. Derivatives of propyl oxy-, butyl oxy-, etc. -arsonic acids can also be prepared by similar procedure.

EXAMPLE V

*3-anilido-glycyl, 4-isoamyloxy, phenyl arsonic acid*

30 grams of 3-amino-4-iso-amyl-oxy-phenyl-arsonic acid which may be prepared according to the method described in Example III are dissolved in a solution of 4 grams of sodium hydroxide in 100 cc. of water.

After adding 17 grams of chloracetanilide the mixture is refluxed for four hours, filtered and acidified with hydrochloric acid.

The 4-isoamyloxy-1-arsonic acid-phenyl-3-glycine-anilide is precipitated. It may be purified by dissolving it in dilute ammonium hydroxide, treating with charcoal, filtering and reprecipitating with dilute hydrochloric acid. It may be represented by the formula:

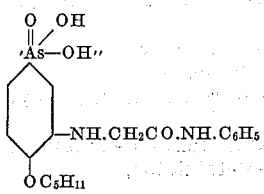

The reaction may be represented:

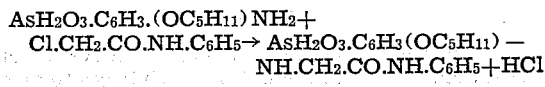

3-amino-4-carboxymethoxy-phenyl arsonic acid cannot be isolated by reduction of the corresponding nitro derivative because a molecule of water is eliminated with the formation of 3-hydroxy-1-4-benzisoxazine-6-arsonic acid which does not react with chloracetyl compounds to form a substituted amino derivative.

However, if the alkaline solution from the reduction of the 3-nitro-4-carboxymethoxy-phenyl-arsonic acid with the reducing agent, as described in Example III, is not acidified, the 3-amino-4-carboxymethoxy-phenyl-arsonic acid remains as such in solution and can then be condensed with an acyl compound, such as

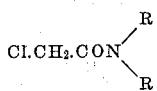

where R is hydrogen or a phenyl group, to form glycine derivatives, such as 2-carboxymethoxy-5-arsonic acid-phenyl-glycinamide, or other glycine derivatives.

EXAMPLE VI

*3-amido-glycyl, 4-carboxymethoxy, phenyl arsonic acid*

51.2 grams of 3-nitro-4-carboxymethoxy-phenyl arsonic acid are dissolved in a solution of 40 grams of sodium carbonate in 320 cc. of water. This is added gradually with stirring to a ferrous hydroxide paste made by mixing together 320 grams of ferrous sulphate in 320 cc. of water and 240 grams of sodium hydroxide in 320 cc. of water.

After stirring for one hour the mixture is filtered, the clear filtrate is acidified until it is just neutral to litmus, and 6.4 grams of sodium hydroxide quickly added.

To this are added 30 grams of chloracetamide and refluxed for three hours. The mixture is cooled and acidified to congo with hydrochloric acid, precipitating the 4-carboxy-methoxy-1-arsonic acid-phenyl-3-glycinamide. This compound may be purified by dissolving it in dilute ammonium hydroxide, treating with some charcoal, filtering and precipitating with dilute hydrochloric acid. It may be represented by the formula:

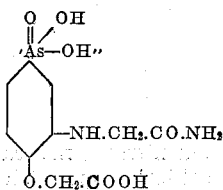

While the substituted amino derivatives of carboxy-methoxy-phenyl-arsonic acid must be prepared by this method for reasons explained above, we prefer to use this method also for the preparation of substituted amino derivatives of other members of this series because it eliminates the isolation of the intermediate amino compound.

EXAMPLE VII

*Derivatives of 4-anilido-acetyl-oxy, phenyl arsonic acid*

A compound of the type described which contains nitrogen in the substituted alkyl radical would be derivatives of 1-arsonic acid-phenyl-4-oxy acetyl-anilide, having the structural formula:

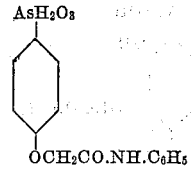

This compound is known and has been previously prepared. However, the nitro and amino or substituted amino derivatives of this compound have not been previously described.

The nitro compound is prepared as follows:

14.04 grams of 1-arsonic acid-4-phenoxy acetyl anilide were dissolved in 42 cc. of sulphuric acid and cooled to 0° C. and nitrated with a mixture of 3.6 grams of nitric acid and 2.5 cc. of sulphuric acid, allowing the temperature to rise to 15° C. This mixture was added to four volumes of crushed ice with stirring and filtered off. It is purified by solution in dilute ammonium hydroxide, treatment with a small quantity of decolorizing carbon such as "nuchar" and reprecipitation with hydrochloric acid. The product is 3-nitro-1-arsonic acid-4-phenoxy acetyl anilide and may be represented by the formula:

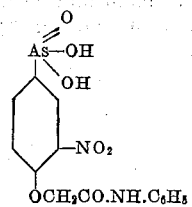

The amino compound is formed by reduction of the above nitro compound as follows:

16 grams of 3-nitro-1-arsonic acid-4-phenoxy acetyl-anilide are dissolved in a solution of 10 grams $Na_2CO_3$ in 80 cc. of $H_2O$. This is added to an alkaline ferrous hydroxide paste which is made as follows: 80 grams of ferrous sulphate are dissolved in 80 cc. $H_2O$ and to this is added with stirring a solution of 60 grams NaOH in 80 cc. H₂O. This is cooled to 20° C. before adding to it the solution of the nitro compound.

This addition is made with stirring and allowing the mixture to react for one hour. It is then filtered, the precipitate washed thoroughly and the combined filtrates neutralized to Congo red with hydrochloric acid. The amino compound is filtered off and purified by solution in dilute ammonium hydroxide and reprecipitation with hydrochloric acid. The compound is 3-amino-1-arsonic acid phenyl-4-oxy acetyl anilide and has this formula:

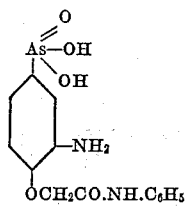

The acetyl derivative of this compound having the formula:

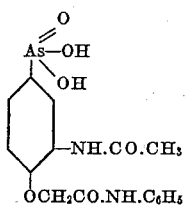

has been prepared by us.

The pentavalent arsenicals produced according to above mentioned reactions may be further reduced so that the arsonic acid group is changed to an arseno group. The following example of the preparation of the arseno-benzene derivatives to which the claims of the present divisional application are drawn will serve for illustrative purposes.

EXAMPLE VIII 3,3'-(p-hydroxy-anilido-glycyl), 4,4'-(carboxymethoxy) arseno benzene Four grams of -N(2-carboxymethoxy-5-arsonic acid-phenyl) glycine-para-hydroxy-anilide are dissolved in 20 cc. of water with the aid of two molecules of sodium hydroxide. This solution is cooled and added slowly to a cooled solution of four grams of magnesium chloride and twenty-five grams of sodium hydrosulphite in 100 cc. of water.

The mixture is filtered and warmed with continuous stirring for one hour at 55° C. The arseno compound separates as a light yellow precipitate which is 4-4'-carboxymethoxy-3-3'-glycine-para-hydroxy - anilide-arseno - benzene and may be represented by the formula:

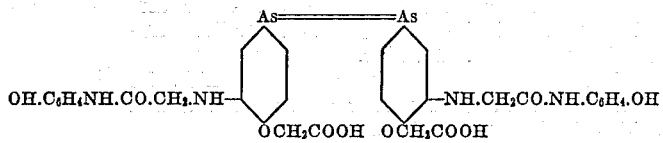

In the same manner we have reduced to corresponding arseno derivatives the following arsonic acid compounds:

N-(2-carboxymethoxy- 5 -arsonic acid-phenyl)-glycine-anilide, 3-acetamino-1-arsonic acid-4-phenoxy acetic acid, N(phenyl-4-carboxymethoxy-1-arsonic acid)-3-glycine amide, N(2-ethoxy-5-arsonic acid-phenyl)-glycine-anilide, N(2-carboxymethoxy- 5 -arsonic acid - phenyl)-glycine-4'-toluidide, as well as other arsonic acid derivatives mentioned in this specification.

SALTS

All of the compounds described above react with alkali metal and alkaline earth bases to give salts.

It will be understood that we have given above only certain preferred embodiments of our invention as examples, and that various other embodiments, as well as modifications, variations, and improvements coming within the spirit of our invention will probably suggest themselves to those skilled in the art. Hence, we do not wish to be restricted to the above examples or uses mentioned, except to the extent indicated in the appended claim, which is to be interpreted as broadly as the state of the art will permit.

We claim as our invention:

A compound having the formula

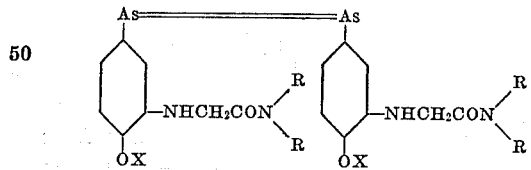

where X is a lower alkyl group and R is selected from the group consisting of hydrogen and phenyl groups.

GEORGE W. RAIZISS.
LE ROY W. CLEMENCE.
ABRAHAM I. KREMENS.